United States Patent [19]

Otsuka

[11] Patent Number: 5,254,420
[45] Date of Patent: Oct. 19, 1993

[54] MAGENTA TONER FOR DEVELOPING ELECTROSTATIC IMAGES, COLORED RESIN, COLORED MOLDED RESIN MEMBER AND COLOR FILTER

[75] Inventor: Masahiro Otsuka, Osaka, Japan

[73] Assignee: Orient Chemical Industries, Ltd., Osaka, Japan

[21] Appl. No.: 803,464

[22] Filed: Dec. 6, 1991

[30] Foreign Application Priority Data

Dec. 14, 1990 [JP] Japan .................. 2-410888

[51] Int. Cl.$^5$ .............................. G03G 9/09
[52] U.S. Cl. ........................ 430/7; 430/109
[58] Field of Search ............... 430/106, 109, 58, 7, 430/6

[56] References Cited

U.S. PATENT DOCUMENTS 3,781,208 12/1973 Ueda et al. ................. 430/106
4,427,753 1/1984 Fujimura ................... 430/58

FOREIGN PATENT DOCUMENTS

3220772A1 12/1982 Fed. Rep. of Germany .
62-147465 7/1987 Japan .
62-196671 2/1988 Japan .
2071677A 3/1981 United Kingdom .

Primary Examiner—John Goodrow
Attorney, Agent, or Firm—McGlew and Tuttle

[57] ABSTRACT

A magenta toner for developing electrostatic images which comprises a resin and at least one kind of the dis-azo dye represented by the following formula [I]:

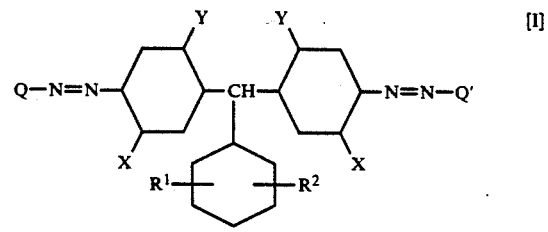

wherein X represents methyl group, ethyl group or alkoxy group having 1 to 4 carbon atoms; Y represents hydrogen atom or methyl group; $R^1$ and $R^2$ independently represent hydrogen atom, alkyl group, alkoxy group or halogen atom; Q and Q' represent naphthol AS residue. This magenta toner is good in transparency, color fastness to light, heat resistance, bleeding resistance and spectral property and offers good color reproduction as a toner for full-color images.

A colored resin, a colored molded resin member and a color filter dyed with at least one kind of the dis-azo dye represented by Formula [I], These are good in color fastness to light, bleeding resistance, heat resistance, transparency, spectral property and durability.

10 Claims, 2 Drawing Sheets

MAGENTA TONER FOR DEVELOPING ELECTROSTATIC IMAGES, COLORED RESIN, COLORED MOLDED RESIN MEMBER AND COLOR FILTER

BACKGROUND OF THE INVENTION

1. Field of the Invention

The present invention relates to a magenta toner for developing electrostatic images used for electrophotography, electrostatic recording, electrostatic printing and other purposes, a resin, a colored molded resin member and a color filter dyed with a red dis-azo dye having the triphenylmethane structure.

2. Description of the Prior Art

In recent years, there have been increasing demands for color toners which offer images of various desired colors as necessary with the diversification of purpose of use of copying machines and printing machines, etc. So-called three primary color toners which offer yellow, magenta and cyan colors, respectively, are important in obtaining full-color images.

This kind of color toners basically comprise a toner resin and a coloring agent. To improve toner chargeability, a light-colored or colorless charge control agent providing a positive or negative charge is often added. When this toner is used as a two-component developing agent, the electrostatic latent image formed on a photoreceptor by charging and exposure is visualized by developing it with the toner charged together mixing with a carrier and transferring the resulting toner image onto transfer paper or another transferee.

To obtain a full-color image by superposing toner images of yellow, magenta and cyan colors, the three subtractive primaries, using such toners for color electrophotography etc., each toner is required to have a good spectral property and transparency for color reproduction. Transparency is also required in toners used for color electrophotography for overhead projectors (hereinafter referred to as OHP). It should also be noted that these toners are required not to be prone to discoloration, fading or bleeding due to light or heat.

Organic pigments are generally most often used as coloring agents for color toners. However, most organic pigments are unsuitable for imparting a color to toners to yield color toners which are required to be transparent in superposing development because they are incompatible with binder resin.

A number of means have been proposed to meet such requirements as far as possible. For example, Japanese Patent Unexamined Publication No. 295069/1987 discloses color toners incorporating various oil-soluble dyes or dispersion dyes; Japanese Patent Unexamined Publication No. 15555/1987 discloses a magenta toner incorporating a Rhodamine dye; Japanese Patent Unexamined Publication No. 217465/1989 discloses a magenta toner incorporating an anthraquinone dispersion dye.

However, color toners incorporating an oil-soluble dye or dispersion dye which is soluble in resin can cause copied image quality deterioration during long term repeated use, thus posing a problem to be solved.

To impart colors to thermoplastic resins, thermosetting resins, color filters, etc., various pigments and dyes are used according to respective uses and purposes.

For example, organic pigments are often used for this purpose, since they are excellent in color fastness to light and heat resistance and offer a wide variety of colors and a lot of brilliant colors.

Oil-soluble dyes and dispersion dyes are used to obtain transparent glossy products, since they possess excellent solubility in resin.

With respect to colored resins and colored molded resin members, transparency is often demanded as well as color fastness to light, bleeding resistance and resistance against heat during molding or in other situations.

Optical color filters needed for television cameras, liquid crystal televisions, flat panel displays on computers, etc., must be good in spectral property and transparency.

Examples of red dyes for optical filters include those disclosed in Japanese Patent Unexamined Publication No. 278569/1989.

Although color filters are often produced by dyeing a dyable film of gelatin, casein, polyvinyl alcohol or the like on a transparent resin or glass base plate with a dye having a given spectral property by printing, sublimational transfer, etc., it is desirable to color the resin itself from the viewpoint of durability.

Of such conventional coloring agents, organic pigments often fail to satisfy the requirement for transparency because they are almost insoluble in resin. On the other hand, oil-soluble dyes and dispersion dyes are prone to discoloration, fading, and bleeding.

Therefore, none of the colored resins, colored molded resin members and color filters which incorporate a conventional coloring agent are said to fully satisfy the essential requirements described above.

SUMMARY OF THE INVENTION

It is an object of the present invention to provide a magenta toner for developing electrostatic images which is good in transparency, color fastness to light, heat resistance, bleeding resistance and spectral property and which offers good color reproduction as a toner for full-color images.

It is another object of the present invention to provide a colored resin or colored molded resin member which is good in color fastness to light, bleeding resistance, heat resistance and transparency.

It is yet another object of the present invention to provide a color filter which is good in transparency, spectral property, bleeding resistance and durability.

As a means for accomplishing the objects described above, the magenta toner for developing electrostatic images of the present invention comprises a resin and at least one kind of the dis-azo dye represented by the following formula [I]:

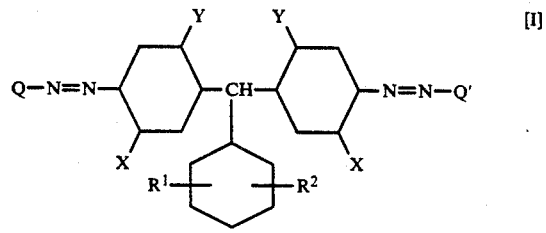

wherein X represents methyl group ethyl group or alkoxy group having 1 to 4 carbon atoms; Y represents hydrogen atom or methyl group; $R^1$ and $R^2$ independently represent hydrogen atom, alkyl group, alkoxy group or halogen atom; Q and Q' represent naphthol AS residue.

This magenta toner for developing electrostatic images is good in transparency, color fastness to light, heat resistance, bleeding resistance and spectral property, offers good color reproduction as a toner for full-color images and yield good copied images even in long term repeated use.

Also, the magenta toner for developing electrostatic images incorporates at least one kind of the dis-azo dye represented by Formula [I] above, a binder resin and a charge control agent, wherein said binder resin and charge control agent are substantially colorless.

Incorporating the substantially colorless binder resin and charge control agent, this magenta toner for developing electrostatic images is not prone to cause tone degradation in toner images and is capable of offering a uniform and stable triboelectrical chargeability even when it is used continuously or under changing conditions.

The magenta toner for developing electrostatic images of the present invention may also comprise a composition obtained by polymerizing a polymerizable composition containing a polymerizable monomer and at least one kind of the dis-azo dye represented by Formula [I] in the presence of a polymerization initiator.

This toner has still better transparency and permits better color reproduction as a toner for full-color images.

The colored resin of the present invention for accomplishing the objects described above contains in solution at least one kind of the dis-azo dye represented by the following formula [I].

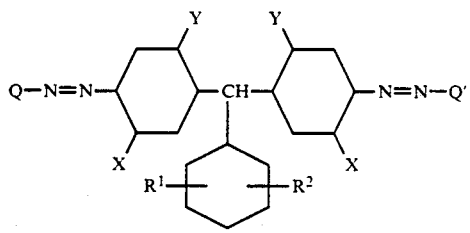

wherein X represents a methyl group, ethyl group or an alkoxy group having 1 to 4 carbon atoms; Y represents a hydrogen atom or methyl group; $R^1$ and $R^2$ independently represent a hydrogen atom, alkyl group, alkoxy group or halogen atom; Q and Q' represent a naphthol AS residue.

This colored resin is good in color fastness to light, bleeding resistance, heat resistance and transparency.

The colored molded resin member of the present invention is obtained by molding the colored resin described above.

The colored molded resin member of the present invention may also be obtained by dyeing a molded resin member with at least one kind of the dis-azo dye represented by Formula [I].

These colored molded resin members are good in color fastness to light, bleeding resistance, heat resistance and transparency.

The color filter of the present invention comprises the colored molded resin member described above, which is obtained by molding a colored resin or by dyeing a molded resin member with a dis-azo dye.

This color filter is good in transparency, spectral property, bleeding resistance and durability.

DETAILED DESCRIPTION OF THE INVENTION

Figure 1:
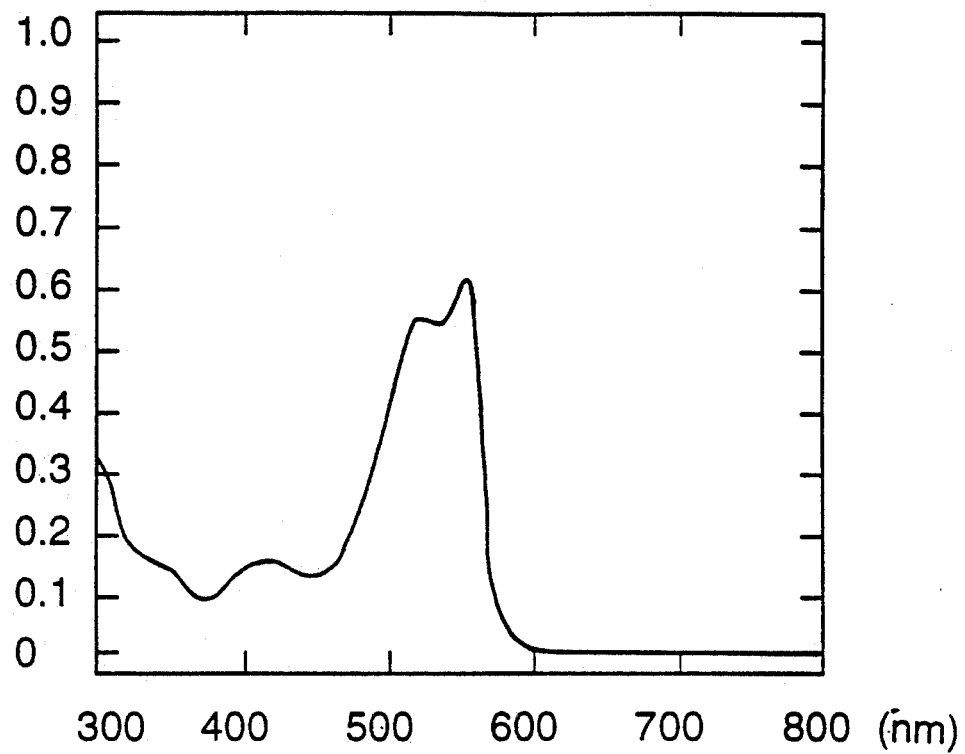
FIG. 1 shows the near ultraviolet-visible light absorption spectrum of Example Dye 1.

The dye represented by Formula [I] for the present invention can be synthesized as follows:

First, an aniline (A)

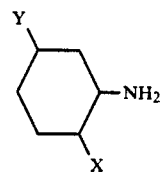

and a benzaldehyde (B)

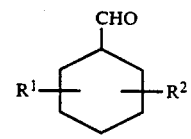

are condensed to a compound (C),

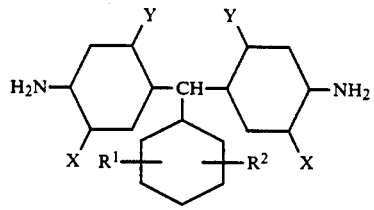

which is then tetrazotized and coupled with a naphthol AS to yield the dye represented by Formula [I].

With respect to the above formulas (A), (B) and (C), X, Y, $R^1$ and $R^2$ have the same definitions as in Formula [I].

X represents methyl group, ethyl group or an alkoxy group having 1 to 4 carbon atoms such as methoxy, ethoxy, propoxy or butoxy; Y represents hydrogen atom or methyl group; $R^1$ and $R^2$ independently represent hydrogen atom, alkyl group such as methyl, ethyl, propyl, iso-propyl, butyl, iso-butyl, sec-butyl, tert-butyl, amyl or iso-amyl, alkoxy group such as methoxy, ethoxy, propoxy or butoxy or atom of halogen such as chlorine, bromine or iodine.

With respect to Formula [I], Q and Q' are naphthol AS residues represented by the following formulas ① through ④, and Q and Q' may be identical or not.

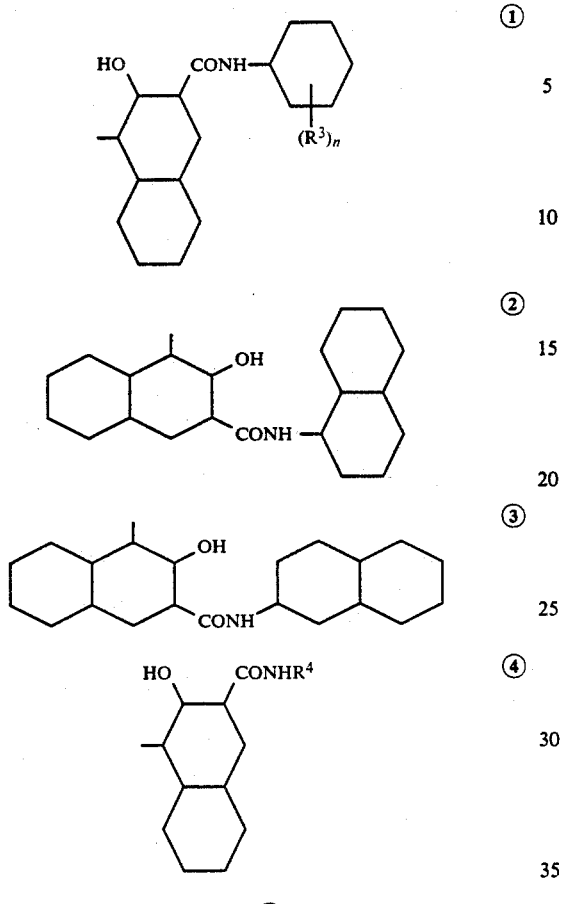

With respect to Formula ①, n represents an integer of 0 to 3; $(R^3)_n$ represents no substituent or one, two or three substituent(s); each $R^3$ substituent independently represent alkyl group such as methyl, ethyl, propyl, iso-propyl, butyl, iso-butyl, sec-butyl, tert-butyl, amyl or iso-amyl, alkoxy group such as methoxy, ethoxy, propoxy or butoxy, atom of halogen such as chlorine, bromine or iodine or a nitro group.

With respect to Formula ④, $R^4$ represents alkyl group such as methyl, ethyl, propyl, iso-propyl, butyl, iso-butyl, sec-butyl, tert-butyl, amyl or iso-amyl or hydroxyalkyl group such as hydroxymethyl, α-hydroxyethyl, β-hydroxyethyl, hydroxypropyl, hydroxybutyl or hydroxyamyl.

Naphthol AS compounds are exemplified by the following compounds (a) through (k), all of which are commercially available.

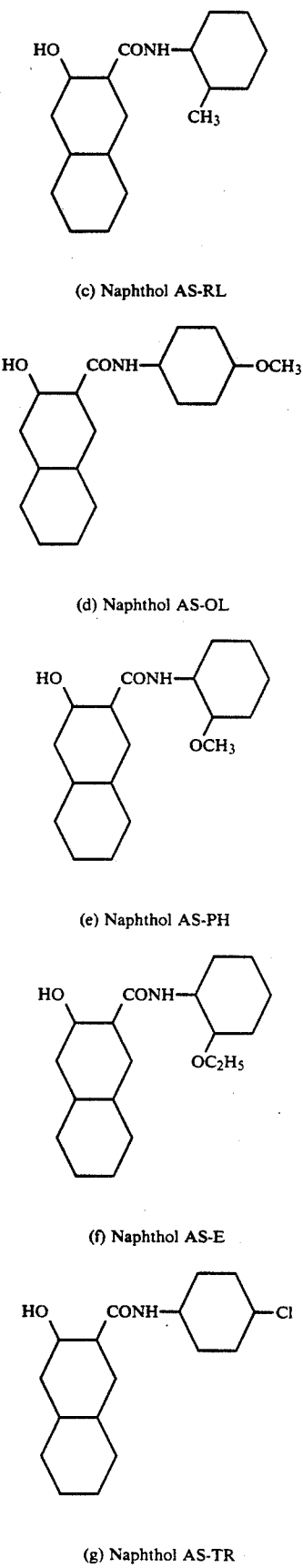

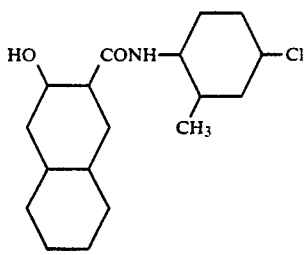

(h) Naphthol AS-BO

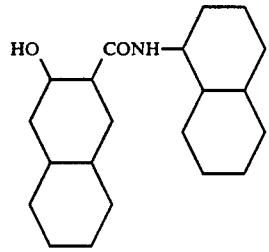

(i) Naphthol AS-SW

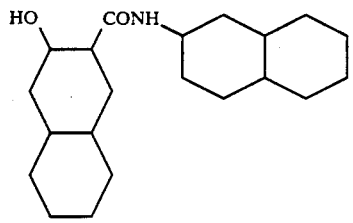

(j) Naphthol AS-BS

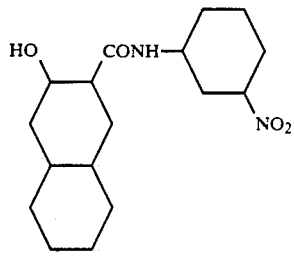

(k) Naphthol BD-1

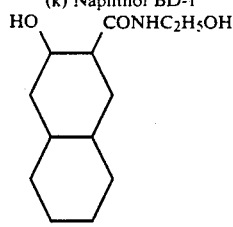

Examples of the dye represented by Formula [I] for the present invention are given in Table 1.

TABLE 1

| Example Dye Number | Aniline component | | Benzaldehyde Benzaldehyde | | Coupler component | | λmax |
|---|---|---|---|---|---|---|---|
| | X | Y | $R^1$ | $R^2$ | Q | Q' | |
| 1 | $CH_3$ | $CH_3$ | H | H | b | b | 522 558 |
| 2 | $CH_3$ | $CH_3$ | H | H | c | c | 522 556 |
| 3 | $CH_3$ | $Ch_3$ | H | H | e | e | 520 554 |
| 4 | $CH_3$ | $CH_3$ | H | H | a | a | 522 |

TABLE 1-continued

| Example Dye Number | Aniline component | | Benzaldehyde Benzaldehyde | | Coupler component | | λmax |
|---|---|---|---|---|---|---|---|
| | X | Y | $R^1$ | $R^2$ | Q | Q' | |
| 5 | $CH_3$ | H | H | H | a | a | 556 516 548 |
| 6 | $OCH_3$ | H | H | H | a | a | 530 560 |
| 7 | $CH_3$ | H | $CH_3$ (para) | $CH_3$ (ortho) | b | b | 520 540 |
| 8 | $OCH_3$ | H | $C_2H_5$ (para) | H | c | c | 526 556 |
| 9 | $CH_3$ | H | $i-C_4H_9$ (para) | H | h | h | 520 556 |
| 10 | $CH_3$ | $CH_3$ | $OCH_3$ (para) | H | c | c | 522 556 |
| 11 | $CH_3$ | $CH_3$ | $i-C_4H_9$ (para) | H | f | f | 524 558 |
| 12 | $CH_3$ | H | $C_2H_5$ (para) | H | g | g | 516 552 |
| 13 | $CH_3$ | H | H | Cl (ortho) | f | f | 520 552 |
| 14 | $CH_3$ | $CH_3$ | H | H | a | b | 522 558 |
| 15 | $OCH_3$ | H | $OCH_3$ (para) | H | c | c | 528 560 |
| 16 | $CH_3$ | $CH_3$ | H | H | j | j | 526 562 |
| 17 | $CH_3$ | $CH_3$ | H | H | k | k | 512 544 |

Figure 2:
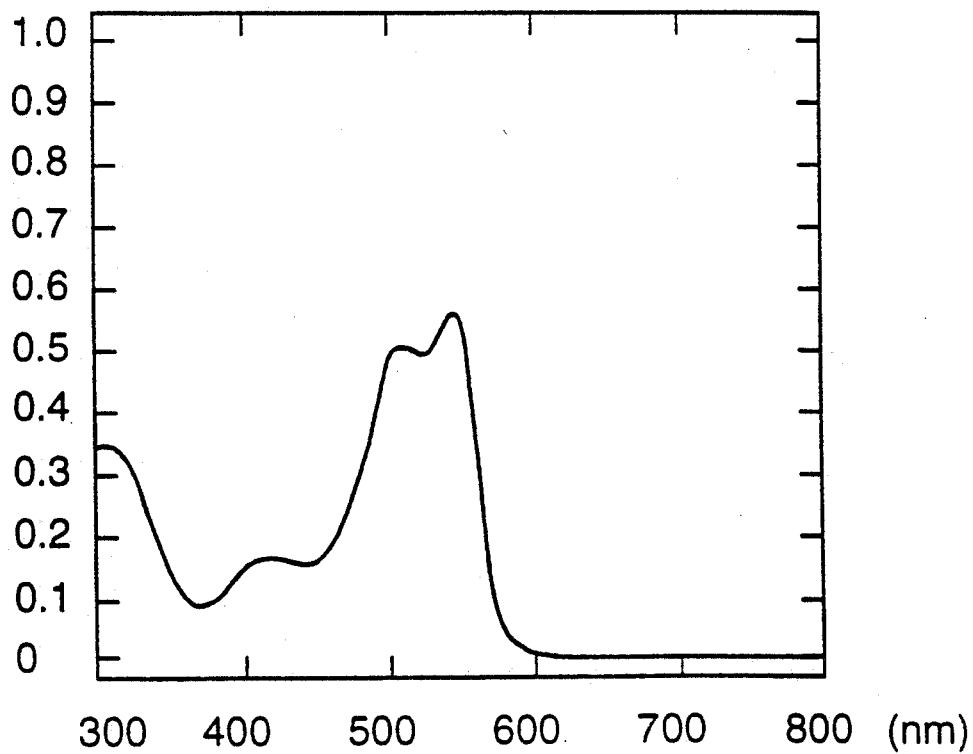
FIG. 2 shows the near ultraviolet-visible light absorption spectrum of Example Dye 3.
Figure 3:
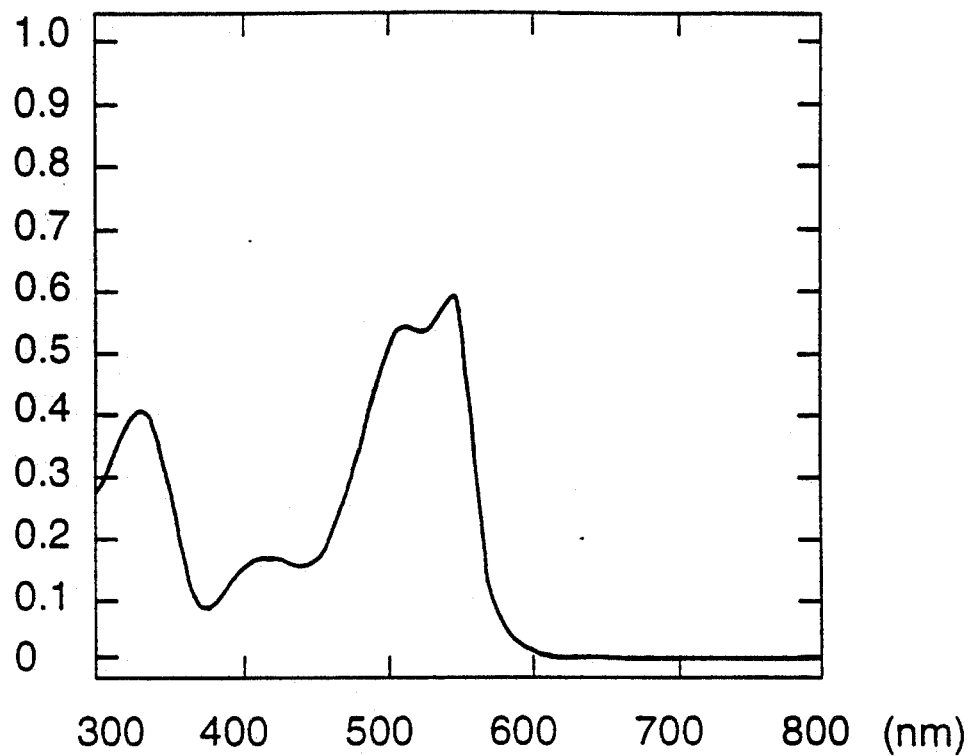
FIG. 3 shows the near ultraviolet-visible light absorption spectrum of Example Dye 9.
Figure 4:
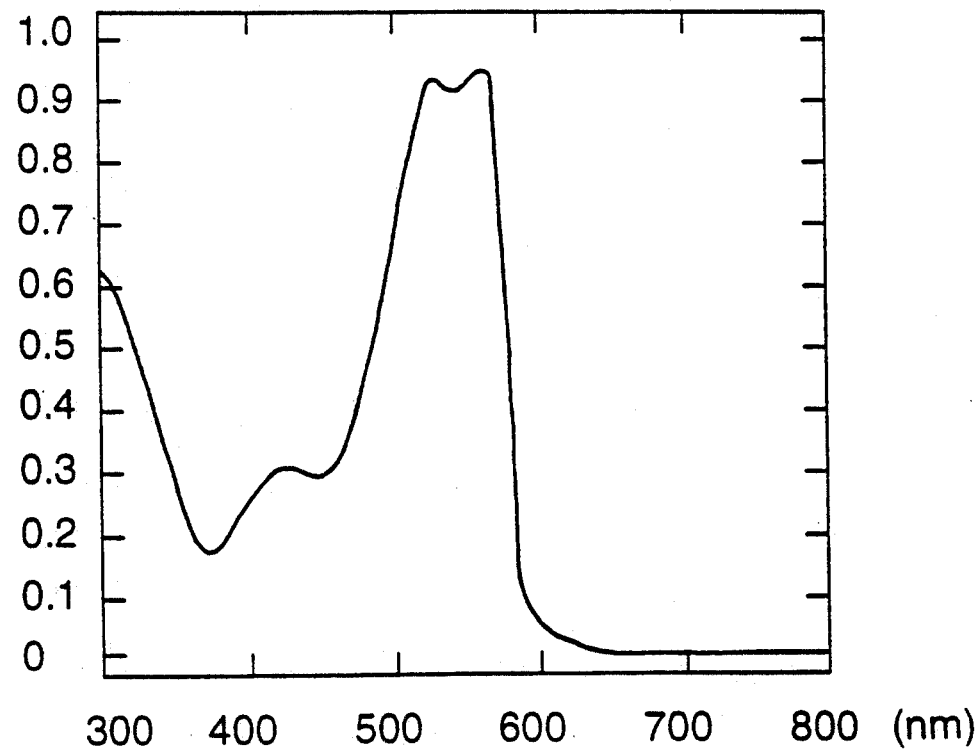
FIG. 4 shows the near ultraviolet-visible light absorption spectrum of Example Dye 10.

In Table 1, λ max shows the maximum value of visible light absorption wavelength of each example dye determined in chloroform solvent using the 8451A Diode Array Spectrophotometer (trade name, produced by Hewlett-Packard). The near ultraviolet-visible absorption spectra of Example Dyes 1, 3, 9 and 10 determined in the same manner as above are shown in FIGS. 1, 2, 3 and 4, respectively. In FIGS. 1 through 4, the abscissa indicates wavelength and the ordinate indicates absorbance.

The magenta toner for developing electrostatic images of the present invention can incorporate almost any conventional toner resin or binder resin. The toner resin or binder resin which is preferably used for the present invention is required to be transparent, substantially colorless (colored to such extent that toner images do not undergo tone deterioration), capable of dissolving or melt-mixing the dis-azo dye represented by Formula [I] for the present invention and positively or negatively chargeable per se or by the addition of a charge control agent, to become fluid under appropriate heat or pressure conditions and to be finely pulverizable.

Examples of such resins which can be preferably used include polystyrene resin, acryl and acrylic resins, styrene-(meth)acrylate copolymer, styrene-methacrylate copolymer and polyester resin. Other usable resins include epoxy resin, polyamide resin, polyvinylal resin, polyethylene resin, polypropylene resin and polyolefin These resins may be used singly or in combination of two or more kinds.

The magenta toner for developing electrostatic images of the present invention may contain a positively or negatively charging charge control agent to improve its chargeability. The charge control agent is preferably substantially colorless. Here, "substantially colorless" means that the color is such that toner images do not undergo tone deterioration.

Charge control agents which can be preferably used for negatively chargeable toners to provide a negative charge are metal complexes of aromatic o-oxycarboxylic acid, metal complexes of aromatic o-aminocarboxylic acid and metal complexes of aromatic dicarboxylic acid. Examples of such metal complexes include the metal complexes of salicylic acid or alkyl salicylic acid disclosed in Japanese Patent Examined Publication No. 42752/1980 (e.g., chromium complex of 3,5-di-tertiary-butylsalicylic acid, chromium complex of salicylic acid), the zinc complexes of aromatic o-oxycarboxylic acid disclosed in Japanese Patent Unexamined Publication No. 69073/1986 (e.g., zinc complex of 3,5-di-tertiary-butylsalicylic acid, zinc complex of oxynaphthoic acid), the aluminum complexes of aromatico-oxycarboxylic acid and aluminum complexes of aromatic o-aminocarboxylic acid disclosed in Japanese Patent Unexamined Publication Nos. 208865/1988 and 105262/1989, and the chromium or zinc complexes of aromatic dicarboxylic aciddisclosed in Japanese Patent Unexamined Publication No. 73963/1986.

Positively charging charge control agents which can be preferably used for positively chargeable toners are quaternary ammonium salt compounds and polyamine compounds. Examples of such charge control agents include the quaternary ammonium salt compounds disclosed in U.S. Pat. No. 4,654,175 and Japanese Patent Examined Publication No. 54694/1989 and the polyamine resin disclosed in Japanese Patent Examined Publication No. 13284/1978. This kind of charge control agents are commercially available under trade names of Bontron E-81, Bontron E-84, Bontron E-88, Bontron P-51 and Bontron P-52 (trade names, produced by Orient Chemical Industries Ltd.).

Examples of polymerizable monomers used in the magenta toner for developing electrostatic images described above include vinyl aromatic monomers such as styrene and methylstyrene, acrylic monomers such as methyl acrylate, ethyl acrylate, phenyl acrylate, methyl methacrylate, butyl methacrylate, 2-ethylhexyl methacrylate and ethyl -hydroxyacrylate, vinyl esters such as vinyl acetate and vinyl propionate, vinyl ethers such as vinyl-n-butyl ether and vinylphenyl ether and unsaturated monoolefins such as ethylene and propylene.

Examples of polymerization initiators which can be used for this magenta toner for developing electrostatic images include azo type initiators such as 2,2'-azobisisobutyronitrile, 2,2'-azobis-2-methylbutyronitrile and 2-t-butylazo-2-cyanopropane and peroxide type initiators such as t-butyl hydroperoxide, di-t-butyl peroxide and benzoyl peroxide.

Although any method of polymerization can be used to polymerize the polymerizable composition described above, solution polymerization, suspension polymerization, mass polymerization, etc. are practically useful.

The toner of the present invention preferably contains the dis-azo dye represented by Formula [I] in an amount of 0.5 to 10 parts by weight, more preferably 1 to 5 parts by weight per 100 parts by weight of resin or binder resin.

The content of the dis-azo dye represented by Formula [I] in the polymerizable composition described above is preferably 10 to 20% by weight.

With respect to the toner of the present invention when it comprises a composition obtained by polymerizing this polymerizable composition, the content of the polymeric composition is preferably 2 to 50 parts by weight, more preferably 5 to 20 parts by weight per 100 parts by weight of resin or binder resin.

The toner of the present invention may incorporate one or more other coloring agents, as long as the purpose or effect thereof is not interfered with.

The amount of charge control agent is preferably 0.1 to 10 parts by weight, more preferably 0.5 to 5 parts by weight per 100 parts by weight of toner resin or binder resin.

To improve toner quality, it is preferable to internally or externally add one or more additives other than the charge control agent, such as a fluidity improving agent and image peeling preventing agent.

The magenta toner for developing electrostatic images of the present invention is, for example, produced as follows:

A toner of 5 to 20 $\mu$m in average particle size can be obtained by thoroughly mixing the dis-azo dye represented by Formula [I] or the above-mentioned polymeric composition containing the dye, a resin or binder resin, a charge control agent and, if necessary, a magnetic material, a fluidizing agent and other additives using a ball mill or another mechanical mixer, subsequently kneading the mixture in a molten state using a hot kneader such as a heat roll, kneader or extruder, cooling and solidifying the mixture, and then pulverizing the mixture and classifying the particles.

Other usable methods include the method in which the starting material is dispersed in binder resin solution and then spray dried, and the polymerizing toner production method in which a given set of materials are mixed in a monomer for binder resin to yield an emulsified suspension which is then polymerized to yield the desired toner (e.g., the methods described in Japanese Patent Unexamined Publication Nos. 260461/1989 and 32365/1990.

When using the toner of the present invention as a two-component developer, development can be achieved by the two-component magnetic brush developing process and other processes using the toner in mixture with carrier powder.

Any known carrier can be used. Examples of the carrier include iron powder, nickel powder. ferrite powder and glass beads of about 50 to 200 $\mu$m in particle size, and such materials as coated with acrylate copolymer, styrene-acrylate copolymer, styrene-methacrylate copolymer, silicone resin, polyamide resin, ethylene fluoride resin or the like.

When using the toner of the present invention as a single-component developer, a small amount of finely divided magnetic powder of ferromagnetic material such as iron powder, nickel powder or ferrite powder may be added and dispersed upon preparing the toner as described above. Examples of developing processes which can be used in this case include contact development and jumping development.

Examples of resins which constitute the colored resin of the present invention include thermoplastic resins such as styrene resin, acryl resin, styrene-acryl copolymer, polycarbonate, polyamide. polybutylene terephthalate. polyethylene. polypropylene. polyacetal and polyester and thermosetting resins such as polyurethane and phenol resin. Particularly, when using the dye represented by Formula [I] in combination with styrene resin, acryl resin, styrene-acryl copolymer or polycarbonate, a colored resin with excellent transparency can be obtained.

The colored resin of the present invention can, for example, be produced by melt-mixing the dis-azo dye represented by Formula [I] in resin. When using the colored resin of the present invention for plastic molding, the dis-azo dye of Formula [I] is compounded in the resin normally at 0.1 to 2% by weight.

Molding of the colored resin of the present invention can be achieved by a known means such as injection molding.

The colored molded resin member of the present invention can, for example, be obtained by dyeing a molded product comprising the same resin as used in the colored resin described above with the dis-azo dye represented by Formula [I] by transfer, printing, sublimation deposition and other means.

The color filter of the present invention can, for example, be produced by the method described in Japanese Patent Unexamined Publication No. 278569/1989 or another method in accordance therewith. Specifically, such methods include the method in which a dye is mixed and kneaded with resin and solvent to yield a ink, which is then used to dye a dyeable plastic base plate of polyester, polyamide, acryl resin or the like, the method in which such an ink is used to form a colored resin film on a transparent base plate of resin or another material, the method in which a dye is kneaded in resin and the resin is molded to a sheet form, the method in which a synthetic resin film is dyed in a solvent such as ethylene glycol, and the method in which an ink composition is coated on paper etc. and transferred onto a resin base plate to dye.

In the colored resin, colored molded resin member and color filter of the present invention, one or more other coloring agents can be used in combination, as long as the purpose or effect thereof are not interfered with.

EXAMPLES

The present invention is hereinafter described in more detail by means of the following examples, but these are not to be construed as limitative on the present invention. In the description below, "part(s) by weight" are referred to as "part(s)" for short.

Examples of synthesis of dis-azo dye for the present invention

Synthesis of 4,4'-benzylidene-di-2,5-xylidine

A mixture of 121 g (1 mol) of 2,5-xylidine, 53 g (0.5 mol) of benzaldehyde, 70 g of concentrate hydrochloric acid and 150 g of chlorobenzene was reacted while refluxing for 7 hours.

After being alkalized in an aqueous solution of caustic soda, the reaction mixture was subjected to steam distillation, followed by residue filtration. The solid separated by filtration was washed with water and dried to yield 130 g of an unpurified base compound.

This compound was purified with an about 3-fold amount of alcohol to yield a white powder represented by the following structural formula. Its melting point was 203° to 205° C.

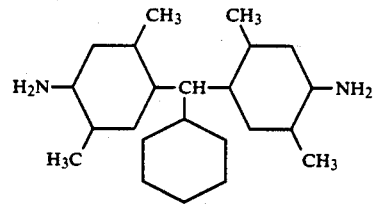

Synthesis of Example Dye 1

8.3 g of 4,4'-benzylidene-di-2,5-xylidine was dissolved and dispersed in 80 g of water containing 12 g of concentrate hydrochloric acid. After cooling the solution to under 5° C., a solution of 7 g of sodium nitrite in a small amount of water was dropwise added thereto for tetrazotization.

Separately, 13.6 g of naphthol AS-D was dissolved in 200 g of water containing 4.5 g of caustic soda. To this solution, 1 g of a nonionic dispersing agent was added, followed by addition of ice to cool the mixture to under 5° C. to yield a coupler solution.

To this coupler solution, the tetrazonium salt solution prepared above was dropwise added for coupling. The resulting crystal was separated by filtration, washed with water and dried to yield 22.5 g of a red powder of dye (Example Dye 1).

Synthesis of Example Dye 11

9.7 g of 4,4'-(p-isobutylbenzylidene)-di-2,5-xylidine was dissolved in 100 g of acetic acid. To this solution, 10 g of concentrate hydrochloric acid was added. After cooling the solution to under 5° C., a solution of 3.5 g of sodium nitrite in a small amount of water was dropwise added thereto for tetrazotization.

14.9 g of naphthol AS-E was dissolved in 100 g of DMF. To this solution, 2 g of a nonionic surfactant was added, followed by cooling to under 10° C. to yield a coupler solution.

While keeping the coupler solution alkaline by dropwise addition of a dilute aqueous solution of caustic soda, the tetrazonium salt solution prepared above was dropwise added thereto for coupling.

The resulting crystal was separated by filtration, washed with water and dried to yield 25 g of a red powder of dye (Example Dye 11).

Examples of preparation of polymeric composition

Preparation of Polymeric Composition 1

140 parts of styrene, 60 parts of n-butyl methacrylate, 50 parts of hydroxyethyl methacrylate, 30 parts of Example Dye 1 and 300 parts of toluene were placed in a three-necked flask equipped with a reflex condenser, and 2 parts of azoisobutyronitrile was added, followed by polymerization at 85° to 100° C. for 10 hours. After completion of the reaction, the unreacted monomer and toluene were removed to yield Polymeric Composition 1.

Preparation of Polymeric Composition 2

100 parts of styrene, 100 parts of n-butyl methacrylate, 50 parts of hydroxyethyl methacrylate, 50 parts of Example Dye 2 and 300 parts of toluene were placed in a three-necked flask equipped with a reflex condenser, and 5 parts of azoisobutyronitrile was added, followed by polymerization at 75° to 90° C. for 10 hours. After completion of the reaction, the unreacted monomer and toluene were removed to yield Polymeric Composition 2. Preparation of Polymeric Compositions 3 through 17

Polymeric Compositions 3 through 17 were prepared in the same manner as in above Examples except that the dyes were replaced with Example Dyes 3 through 17 listed in Table 1 and the type and amount of polymerization initiator were varied as appropriate.

EXAMPLE 1

Styrene-acryl copolymer [HIMER TB-1000 (trade name), produced by Sanyo Kasei Co., Ltd.] . . . 100 parts Example Dye 1 . . . 3 parts Charge control agent [Bontron E-84 (trade name), produced by Orient Chemical Industries Ltd.] . . . . 1.5 parts Low polymer propylene [Biscal 550-P (trade name), produced by Sanyo Kasei Co., Ltd.] . . . . 10 parts The above ingredients were uniformly pre-mixed using a high-speed mixer, and then kneaded in a molten state using an extruder, cooled, and roughly milled in a vibration mill. The obtained coarse product was finely pulverized using an air jet mill equipped with a classifier to obtain a fine powder of toner of 5 to 20 μm in particle size.

5 parts of this toner was admixed with 95 parts of a resin-coated iron powder carrier [F813-150 (trade name), produced by Nippon Teppun Co., Ltd.) to yield a developer.

This developer was found to be $-20.2$ $\mu$C/g in the amount of initial blowoff charges. The amounts of initial blowoff charges of this developer under low-temperature low-humidity conditions (5° C., 30% relative humidity) and high-temperature high-humidity conditions (35° C., 90% relative humidity) were $-20.3$ $\mu$C/g and $-20.5$ $\mu$C/g, respectively, indicating very high stability.

When this developer was used for a commercial copying machine (selenium drum type) to form toner images, fog-free very distinct glossy magenta color images were obtained. Even long term repeated use permitted the obtainment of stable copies free of quality degradation.

EXAMPLE 2

Polyester [HP-301, produced by The Nippon Synthetic Chemical Industry, Co., Ltd.] . . . 100 parts Example Dye 6 . . . 3 parts Charge control agent [Bontron E-81 (trade name), produced by Orient Chemical Industries Ltd.] . . . . 1.2 parts Low polymer propylene [Biscal 550-P (trade name), produced by Sanyo Kasei Co., Ltd.] . . . . 10 parts The above ingredients were treated in the same manner as in Example 1 to yield a toner. Three parts of the obtained toner was admixed with 97 parts of an iron powder carrier [TEFV200/300 (trade name), produced by Nippon Teppun Co., Ltd.] to yield a developer. This developer was found to be $-22.4$ $\mu$C/g in the amount of initial blowoff charges.

When copies were taken in the same manner as in Example 1, this developer gave fog-free distinct magenta images with high thin-line reproducibility. Even long term repeated use permitted the obtainment of stable copies free of image quality degradation.

EXAMPLE 3

Styrene-acryl copolymer [HIMER TB-1000 (trade name), produced by Sanyo Kasei Co., Ltd.] . . . 100 parts Polymeric Composition 1 . . . 15 parts Charge control agent [Bontron E-88 (trade name), produced by Orient Chemical Industries Ltd.] . . . 1 part Low polymer propylene [Biscal 550-P (trade name), produced by Sanyo Kasei Co., Ltd.] . . . 10 parts The above ingredients were treated in the same manner as in Example 1 to yield a toner. Three parts of the obtained toner was admixed with 97 parts of an iron powder carrier [TEFV200/300 (trade name), produced by Nippon Teppun Co., Ltd.] to yield a developer. This developer was found to be $-20.2$ $\mu$C/g in the amount of initial blowoff charges.

When the developer was used for a commercial color copying machine [produced by Canon Inc.] to take copies, fog-free very distinct magenta images were obtained. Even long term repeated use permitted the obtainment of stable copies free of image quality degradation.

When images were formed using this developer on images formed using a yellow toner developer and images were formed thereon using a cyan toner developer, color images with good color reproduction were obtained.

EXAMPLE 4

Styrene-acryl copolymer [HIMER TB-1000 (trade name), produced by Sanyo Kasei Co., Ltd.] . . . 100 parts Example Dye 11 . . . 2.5 parts Charge control agent [Bontron P-51 (trade name), produced by Orient Chemical Industries Ltd.] . . . . 1.2 parts Low polymer propylene [Biscal 550-P (trade name), produced by Sanyo Kasei Co., Ltd.] . . . 10 parts The above ingredients were treated in the same manner as in Example 1 to yield a toner. Three parts of the obtained toner was admixed with 97 parts of an iron powder carrier [TEFV200/300 (trade name), produced by Nippon Teppun Co., Ltd.] to yield a developer. This developer was found to be $+22.8$ $\mu$C/g in the amount of initial blowoff charges.

When the developer was used for a commercial copying machine [Canon NP (trade name), produced by Canon Inc.] to take copies, fog-free very distinct magenta images were obtained. Even long term repeated use permitted the obtainment of stable copies free of image quality degradation.

When copied images on an OHP sheet were projected on a screen using an OHP, images with distinct magenta color were obtained.

EXAMPLE 5

Styrene-acryl copolymer [HIMER TB-1000 (trade name). produced by Sanyo Kasei Co., Ltd.] . . . 100 parts Example Dye 9 . . . 5 parts Iron sesquioxide ($Fe_2O_3$) . . . 15 parts Charge control agent [Bontron P-51 (trade name), produced by Orient Chemical Industries Ltd.] . . . 1 part Low polymer propylene [Biscal 550-P (trade name), produced by Sanyo Kasei Co., Ltd.] . . . 10 parts The above ingredients were uniformly pre-mixed using a ball mill to yield a premix, which was then kneaded in a molten state using a twin-screw extruder [PCM-30 (trade name), produced by Ikegai Seisakusho Co., Ltd.], cooled and thereafter roughly crushed, finely pulverized and classified to yield a single-component toner of 5 to 15 μm in particle size.

When this toner was used for a commercial copying machine [NP-201 (trade name), produced by Canon Inc.] to form toner images, fog-free magenta images were obtained with high quality.

COMPARATIVE EXAMPLE 1

A toner was prepared and used to form copied images in the same manner as in Example 1 except that the dis-azo dye used in Example 1 (Example Dye 1) was replaced with C. I. Solvent Red 22 (C.I. 21250). The initially obtained copied images had a distinct red color, but repeated copying for a long period resulted in uneven copying with color density degradation and fogging.

COMPARATIVE EXAMPLE 2

A toner was prepared and used to form copied images in the same manner as in Example 1 except that the dis-azo dye used in Example 1 (Example Dye 1) was replaced with C. I. Pigment Red 61 (C.I. 24830:1). The initially obtained copied images had a distinct red color, but the image density was lower than that obtained in Example 1 and repeated copying for a long period resulted in uneven copying with color density degradation. Also, the images copied on an OHP sheet lacked transparency and were not suitable for use for OHP.

EXAMPLE 6

500 g of polystyrene resin [Dialex (trade name), produced by Mitsubishi Monsanto Chemical Co.] and 0.25 g of Example Dye 1 as a coloring agent were placed in a stainless steel tumbler and mixed thoroughly for 1 hour. This mixture was kneaded in a molten state at 200° C. using a vent-type extruder (trade name: E30SV, produced by Enpla Sangyo Co.) and pelletized by a standard method to yield a colored pellet.

This pellet was then dried at 80° C. for 3 hours and subsequently subjected to an ordinary method of injection molding at a molding temperature of about 200° C. using an injection molding machine (trade name: K-25C, produced by Kawaguchi Tekko Co.) to prepare a test plate. Example Dye 1 well endured the heat during kneading in a molten state and molding, giving a red molded plate with excellent transparency.

The color fastness to light of this molded plate was found to be of grade 6, and its bleeding resistance was of grade 5, each of which were good.

The color fastness to light was determined by applying the test plate to a fade-Ometer (carbon arc type) for 40 hours and then comparing its status with the normal status using a blue scale (Japanese Industrial Standard JIS L0841). The higher the grade number is, the better the color fastness to light is. The same applies in the following Examples and Comparative Examples.

Bleeding resistance was determined by leaving the test plate at 120° C. for 24 hours while keeping the test plate under a load of 200 g/cm² between two uncolored molded plates of the same material as the test plate, and then evaluating the degree of staining onto the uncolored molded plates using a grey scale (Japanese Industrial Standard JIS L0805). The higher the grade number is, the better the bleeding resistance is. The same applies in the following Examples and Comparative Examples.

EXAMPLE 7

500 g of methacryl resin [Acrypet (trade name), produced by Mitsubishi Rayon Co., Ltd.] and 0.25 g of Example Dye 9 as a coloring agent were mixed in a molten state at 210 and pelletized by a standard method to yield a colored pellet. Then, this pellet was treated in the same manner as in Example 6 to yield a red transparent molded plate.

This molded plate was found to be good in color fastness to light at grade 6 and bleeding resistance at grade 5.

COMPARATIVE EXAMPLE 3

To compare color fastness to light, bleeding resistance and light transmittance, a molded plate was prepared in the same manner as in Example 6 except that Example Dye 1 used in Example 6 was replaced with C. I. Pigment Red 61.

This molded plate was found to be of good in color fastness to light and bleeding resistance, but compatibility with resin was poor and the light transmittance was very low.

EXAMPLE 8

Example Dye 1, acryl resin and toluene were mixed and kneaded to yield a gravure printing ink.

Using this ink, printing was performed on a polycarbonate base plate by gravure printing, and the ink film was dried to form a colored resin film to yield a red optical filter.

This filter was found to be good in color fastness to light at grade 6 and bleeding resistance at grade 5. Its spectral property was also good.

EXAMPLE 9

On a molded plate of methacrylate resin [Acrypet (trade name), produced by Mitsubishi Rayon Co., Ltd.], a sheet of transfer paper, prepared from 2 g of Example Dye 3, 10 g of Pyronal MD1200 [(trade name), produced by Toyobo Corporation] and 1 g of silica gel, was placed, followed by calendering at 200° C. to yield a red filter as a result of dyeing the molded plate.

This filter was found to be good in color fastness to light at grade 6 and bleeding resistance at grade 5. Its spectral property was as good as in Example 8.

EXAMPLE 10

5 g of polyester film and 2 g of Example Dye 10 were added to 1000 g of ethylene glycol, and the polyester film was dyed at 120° C. for 90 minutes to yield a red filter. This filter was found to be good in color fastness to light at grade 6 and bleeding resistance at grade 5. Its spectral property was as good as in Example 8.

COMPARATIVE EXAMPLE 4

To compare color fastness to light and bleeding resistance, a red filter was prepared in the same manner as in Example 8 except that Example Dye 1 used in Example 8 was replaced with C. I. Solvent Red 54.

The color fastness to light of this red filter was found to be of grade 5 and its bleeding resistance was of grade 4 to 5.

What is claimed is:

1. A magenta toner for developing electrostatic images which comprises a resin and at least one kind of the dis-azo dye represented by the following formula [I]:

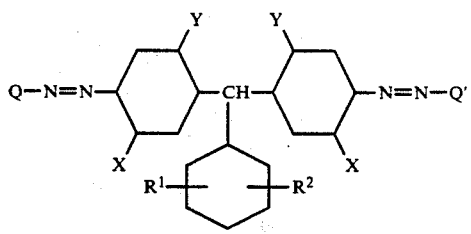

wherein X represents methyl group, ethyl group or alkoxy group having 1 to 4 carbon atoms; Y represents hydrogen atom or methyl group; $R^1$ and $R^2$ independently represent hydrogen atom, alkyl group, alkoxy group or halogen atom; Q and Q' represent naphthol AS residue.

2. A magenta toner for developing electrostatic images which comprises a binder resin, a charge control agent and at least one kind of the dis-azo dye represented by the following formula [I]:

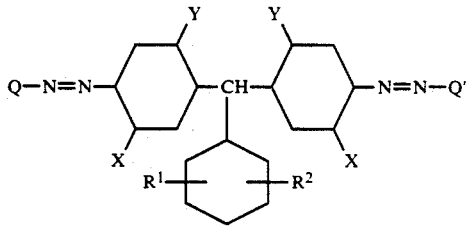

wherein X represents methyl group, ethyl group or alkoxy group having 1 to 4 carbon atoms; Y represents hydrogen atom or methyl group; $R^1$ and $R^2$ independently represent hydrogen atom, alkyl group, alkoxy group or halogen atom; Q and Q' represent naphthol AS residue, wherein said binder resin and charge control agent are substantially colorless.

3. The magenta toner for developing electrostatic images of claim 2 wherein said charge control agent is negatively charging charge control agent selected from the group consisting of metal complexes of aromatic o-oxycarboxylic acid, metal complexes of aromatic o-aminocarboxylic acid and metal complexes of aromatic dicarboxylic acid.

4. The magenta toner for developing electrostatic images of claim 2 wherein said charge control agent is positively charging charge control agent selected from the group consisting of quaternary ammonium salt compounds and polyamine compounds.

5. A magenta toner for developing electrostatic images comprising a composition obtained by polymerizing polymerizable composition in the presence of polymerization initiator wherein said polymerizable composition contains polymerizable monomer and at least one kind of the dis-azo dye represented by Formula [I]:

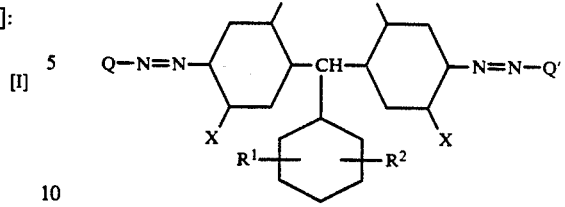

wherein X represents methyl group, ethyl group or alkoxy group having 1 to 4 carbon atoms; Y represents hydrogen atom or methyl group; $R^1$ and $R^2$ independently represent hydrogen atom, alkyl group, alkoxy group or halogen atom; Q and Q' represent naphthol AS residue.

6. A colored resin containing in solution at least one kind of the dis-azo dye represented by the following formula [I]:

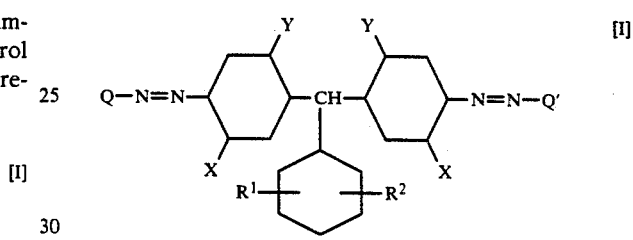

wherein X represents methyl group, ethyl group or alkoxy group having 1 to 4 carbon atoms; Y represents hydrogen atom or methyl group; $R^1$ and $R^2$ independently represent hydrogen atom, alkyl group, alkoxy group or halogen atom; Q and Q' represent naphthol AS residue.

7. A colored molded resin member obtained by molding the colored resin of claim 6.

8. A colored molded resin member obtained by dyeing a molded resin member with t least one kind of the dis-azo dye represented by the following formula [I]:

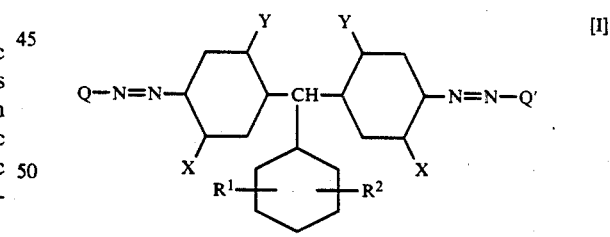

wherein X represents methyl group, ethyl group or alkoxy group having 1 to 4 carbon atoms; Y represents hydrogen atom or methyl group; $R^1$ and $R^2$ independently represent hydrogen atom, alkyl group, alkoxy group or halogen atom; Q and Q' represent naphthol AS residue.

9. A color filter comprising the colored molded resin member of claim 7.

10. A color filter comprising the colored molded resin member of claim 8.

* * * * *